(12) United States Patent
Dewan et al.

(10) Patent No.: US 9,189,620 B2
(45) Date of Patent: Nov. 17, 2015

(54) PROTECTING A SOFTWARE COMPONENT USING A TRANSITION POINT WRAPPER

(75) Inventors: Prashant Dewan, Hillsboro, OR (US); Vedvyas Shanbhogue, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 982 days.

(21) Appl. No.: 12/459,359

(22) Filed: Jun. 30, 2009

(65) Prior Publication Data

US 2010/0333206 A1 Dec. 30, 2010

(51) Int. Cl.
*H04L 29/06* (2006.01)
*G06F 21/53* (2013.01)
*G06F 12/10* (2006.01)

(52) U.S. Cl.
CPC ............ *G06F 21/53* (2013.01); *G06F 12/1009* (2013.01); *G06F 12/1027* (2013.01)

(58) Field of Classification Search
CPC .................... G06F 12/1027; G06F 12/1009
USPC .......................................................... 726/27
See application file for complete search history.

(56) References Cited

U.S. PATENT DOCUMENTS

| | | | | |
|---|---|---|---|---|
| 5,918,004 | A * | 6/1999 | Anderson et al. | 714/38.13 |
| 2002/0108050 | A1* | 8/2002 | Raley et al. | 713/193 |
| 2007/0006175 | A1* | 1/2007 | Durham et al. | 717/131 |
| 2007/0156999 | A1* | 7/2007 | Durham et al. | 711/170 |
| 2008/0022129 | A1* | 1/2008 | Durham et al. | 713/189 |
| 2008/0244573 | A1* | 10/2008 | Sahita et al. | 718/1 |
| 2009/0006714 | A1* | 1/2009 | Durham et al. | 711/6 |
| 2009/0038017 | A1* | 2/2009 | Durham et al. | 726/27 |
| 2009/0172328 | A1* | 7/2009 | Sahita et al. | 711/163 |
| 2009/0172346 | A1* | 7/2009 | Sahita et al. | 711/208 |
| 2009/0222792 | A1* | 9/2009 | Shanbhogue et al. | 717/111 |
| 2009/0327575 | A1* | 12/2009 | Durham et al. | 711/6 |
| 2010/0169667 | A1* | 7/2010 | Dewan | 713/193 |

OTHER PUBLICATIONS

Dewan et al., A Hypervisor-based system for protecting software runtime memory and persistent storage, Apr. 2008, Retrieved from the Internet <URL: dl.acm.org/citation.cfm?id=1400685>, pp. 1-9 as printed.*
Sahita et al., Mitigating the Lying-Endpoint Problem in Virtualized Network Access Frameworks, Oct. 2007, Retrieved from the Internet <URL: informatik.uni-trier.de/~ley/db/conf/dsom/dsom2007.html>, pp. 1-15 as printed.*
Shanbhogue et al., Virtualization Enabled Integrity Services (VIS), Nov. 2007, Retrieved from the Internet <URL:xen.org/xensummit/xensummit_fall_2007.html>, pp. 1-12 as printed.*

(Continued)

*Primary Examiner* — Michael Chao
(74) *Attorney, Agent, or Firm* — Thomas R. Lane

(57) ABSTRACT

Embodiments of apparatuses, articles, methods, and systems for protecting software components using transition point wrappers are generally described herein. In one embodiment, an apparatus includes a first component, a wrapper component, and a management module. The wrapper component is to transform a transition point between the first component and a second component. The management module is to control access to the first component through the transformed transition point. Other embodiments may be described and claimed.

10 Claims, 4 Drawing Sheets

(56) References Cited

OTHER PUBLICATIONS

Shanbhogue et al., Xen Extensions for Virtualization Enabled Integrity Services on HVM Domains, 2007, Retrieved from the Internet <URL: http://www-archive.xenproject.org/files/xensummit_fall07/A21_VedvyasShanbhougue.pdf>, pp. 1-7 as printed.*

Ott, David, Virtualization and Performance: Understanding VM Exits, 2009, Retrieved from the Internet <URL: http://software.intel.com/en-us/blogs/2009/06/25/virtualization-and-performance-understanding-vm-exits>, p. 1 as printed.*

Sahita et al., Towards a Virtualization-enabled Framework for Information Traceability (VFIT), 2008, Retrieved from the Internet <URL: http://link.springer.com/chapter/10.1007/978-0-387-77322-3_7>, pp. 1-19 as printed.*

Father, Holy (pseudonym); Hooking Windows API—Technics of hooking API functions on Windows; 2002; Retrieved from the Internet <URL: pr0g.free.fr/fichiers/APJ/APJ-2004-157.pdf>; pp. 1-30 as printed.*

* cited by examiner

PROTECTING A SOFTWARE COMPONENT USING A TRANSITION POINT WRAPPER

FIELD

Embodiments of the present invention relate generally to the field of computer architecture, and more particularly to protecting software components within an execution environment of such architectures.

BACKGROUND

Software programs are subject to complex and evolving attacks by malware seeking to gain control of computer systems. These attacks can take on a variety of different forms ranging from attempts to crash the software program to subversion of the program for alternate purposes. Additionally, programs are subject to operating system failures and bugs within other programs that can cause corruption of unrelated programs running in the same linear address space. Some recent proposals for securing software programs involve creation of multiple execution environments and sequestering protected programs into a protected execution environment. However, this approach typically requires multiple operating systems and may present operating inefficiencies.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, apparatus, and system for protecting software components using transition point wrappers.

Various aspects of the illustrative embodiments will be described using terms commonly employed by those skilled in the art to convey the substance of their work to others skilled in the art. However, it will be apparent to those skilled in the art that alternative embodiments may be practiced with only some of the described aspects. For purposes of explanation, specific devices and configurations are set forth in order to provide a thorough understanding of the illustrative embodiments. However, it will be apparent to one skilled in the art that alternative embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A)B" means "(B) or (A and B)," that is, A is optional.

Figure 1:
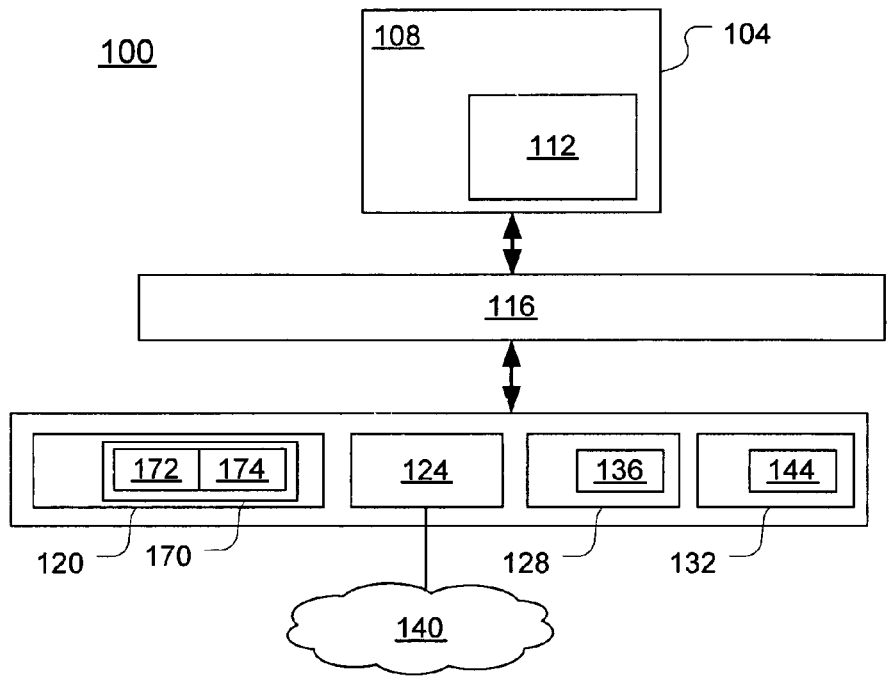
FIG. 1 illustrates a platform to provide partitioning of components within an execution environment, in accordance with an embodiment of the present invention.

FIG. 1 illustrates a platform 100 to provide for partitioning of components and/or portions of components within an execution environment, in accordance with an embodiment of the present invention. The platform 100 may have an execution environment 104, which may be the domain of an executing operating system (OS) 108. The OS 108 may be a component configured to execute and control general operation of other components within the execution environment 104, such as the software component 112, subject to partition access protections provided to selected components by a management module 116, to be discussed in further detail below.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In addition to partitioning selected components of the execution environment 104, the management module 116 may arbitrate general component access to hardware resources such as one or more processor(s) 120, network interface controller 124, storage 128, and/or memory 132.

The processor(s) 120 may execute programming instructions of components of the platform 100. The processor(s) 120 may be single and/or multiple-core processor(s), controller(s), application specific integrated circuit(s) (ASIC(s)), etc.

In an embodiment, storage 128 may represent non-volatile storage to store persistent content to be used for the execution of the components on the platform 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource physically part of the platform 100 or it may be accessible by, but not necessarily a part of, the platform 100. For example, the storage 128 may be accessed by the platform 100 over a network 140 via the network interface controller 124.

Upon a load request, e.g., from a loading agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the platform 100. In various embodiments, the memory 132 may include RAM, dynamic RAM (DRAM), static RAM (SRAM), synchronous DRAM (SDRAM), dual-data rate RAM (DDRRAM), etc.

In some embodiments the memory 132 may organize content stored therein into a number of groups of memory locations. These organizational groups, which may be fixed and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the execution environment 104 may provide a virtual execution environment, in which the components may operate, having a large logical/linear address space, which may then be mapped into physical pages of the memory 132. Memory management logic 170 in processor 120, using page tables maintained by the OS 108 and/or management module 116, may translate the logical/linear addresses provided by components of the execution environment 104 to physical address of the memory 132.

Memory management logic 170 may include page table pointer storage location 172 and target list storage location 174. Page table pointer storage location 172 may be used to store a pointer to the page table that is to be used by memory management logic 170 for the translation. The page table pointer may point to the first page table in a hierarchical structure of page tables. Therefore, the contents of page table pointer storage location 172 may be changed to effect a context switch. When a component operating in execution environment 104 attempts to access a logical/linear address for which the page table pointer's page table does not have a valid or permitted translation (e.g., the requested content is not loaded into memory 132), or attempts to change the contents of page table pointer storage location 172 at an insufficient privilege level, memory management logic 170 may cause a page fault, trap, or other exception to occur, to facilitate the management of the operation of components in execution environment 104 by OS 108 and/or management module 116. However, OS 108 and/or management module 116 may also create and maintain a "target" list of page table pointers for which there is no need for OS 108 and/or management module 116 to be invoked prior to use. The target list may be stored in target list storage location 174, to be accessible by memory management logic 170 to change the contents of page table pointer storage location 172 without a trap or exception.

More details of the implementation of paging, and in particular paging with respect to partitioning of components, may be given below in accordance with embodiments of this invention.

In various embodiments, the component 112, or portions thereof, may be selected for partitioning and the management module 116 may identify and partition off portions of the component 112 to control access by the OS 108 to the component 112. Partitioned portions may include any portion, up to all, of the particular component. A partitioned portion may be sequestered, either physically or virtually, from other components within the same execution environment, such that intra-execution environment accesses may be monitored and restricted, if necessary. Partitioning may facilitate insulation of, e.g., component 112 from the OS 108, without requiring that the component 112 operate in an entirely separate execution environment, with a separate OS. Partitioning may also afford the component 112 a level of protection from other components, even those of similar or higher privilege levels, within the execution environment 104 that may be compromised in some manner, e.g., by malware, critical runtime failures, etc. Embodiments of this invention may provide for this protection while still allowing permitted interactions between the component 112 and other components, e.g., the OS 108, of the execution environment 104. Controlling access by the OS 108 to the component 112 may include various levels of access restrictions as will be discussed below in further detail.

In various embodiments, partitioning of components within an execution environment may be useful in a platform having multiple, execution environments, such as virtual machines operating in a virtualization technology (VT) enabled platform. In such an embodiment, a management module may include, or be a part of, a virtual machine monitor (VMM).

Figure 2:
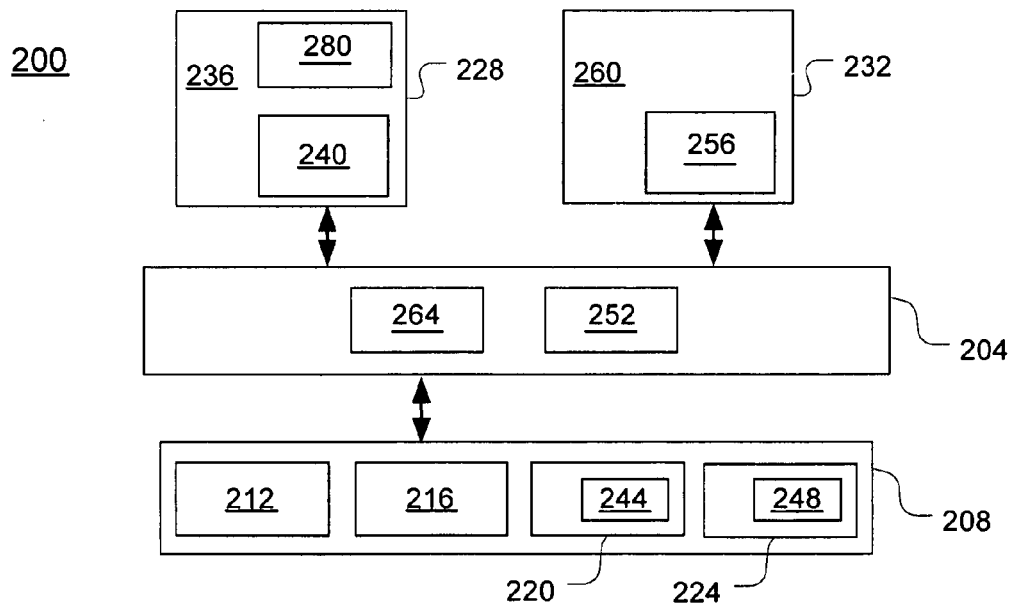
FIG. 2 illustrates a platform utilizing parallel execution environments, in accordance with an embodiment of the present invention.

FIG. 2 illustrates a platform 200 utilizing virtualization to provide parallel execution environments in accordance with an embodiment of this invention. In various embodiments, the platform 200 may be similar to, and substantially interchangeable with, the platform 100. Furthermore, elements described below may be similar to, and substantially interchangeable with, like-named elements described above, and vice versa.

In this embodiment a management module, e.g., virtual machine monitor (VMM) 204, on the platform 200 may present multiple abstractions and/or views of the platform hardware 208, e.g., one or more processor(s) 212, network interface controller 216, storage 220, and/or memory 224, to the one or more independently operating execution environments, or "virtual machines (VMs)," e.g., guest VM 228 and auxiliary VM 232. The auxiliary VM 232 may be configured to execute code independently and securely isolated from the guest VM 228 and may prevent components of the guest VM 228 from performing operations that would alter, modify, read, or otherwise affect the components of the auxiliary VM 232. While the platform 200 shows two VMs, other embodiments may employ any number of VMs.

The components operating in the guest VM 228 and auxiliary VM 232 may each operate as if they were running on a dedicated computer rather than a virtual machine. That is, components operating in the guest VM 228 and auxiliary VM 232 may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

The guest VM 228 may include an OS 236 and component 240. Upon a designated event, the VMM 204 may identify and partition off portions of the component 240 to control access to the partitioned portions by the OS 236. In various embodiments, a designated event may be when stored content 244 is loaded from storage 220 to memory 224, as active content 248. However, in various embodiments, other designated events may be additionally/alternatively used.

Figure 3:
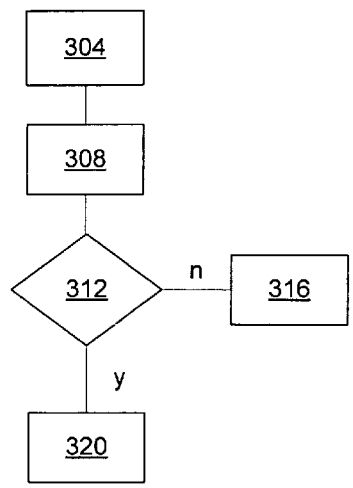
FIG. 3 illustrates operational phases of partitioning of portions of a component, in accordance with an embodiment of the present invention.

Partition based protections may be provided to component 240 as described in FIG. 3 in accordance with an embodiment of this invention. Operational phases shown in FIG. 3 may be referenced by numerals within parentheses. The component 240 may register with the VMM 204, and more particularly, with an integrity services module (ISM) 252 of the VMM 204 for protection (304). In various embodiments, the registration (304) may take place upon an occurrence of a registration event, e.g., loading of the active content 248 into memory 224, periodically, and/or in some other event-driven manner. In various embodiments, the registration (304) may be initiated by the component 240, another component within the VM 228, e.g., the OS 236, the VMM 204, or a component of the VM 232.

Upon receiving the registration, the ISM 252 may cooperate with an integrity measurement module (IMM) 256 operating in the VM 232 to verify an integrity of the component 112 (308). Verification of the integrity of the component 112 may help to prevent unauthorized modification and/or malicious termination, and may ensure that only recognized components may be afforded protection. The IMM 256 may operate in the VM domain 232 in the context of an OS 260 and may, therefore, be largely independent of OS 236. By running outside of the context of the VM 228 the IMM 256 may have measurement capabilities that are not present, or possibly compromised, in the context of the OS 236.

The IMM 256 may provide the ISM 252 a response to verification request (308) such as pass, fail, pass w/qualification, fail w/qualification, etc. In various embodiments, qualifications may reflect degrees of integrity verification between pass and fail.

In some embodiments, the active content 248 may include an integrity manifest, which may be a collection of information to be used in the verification of the integrity of the component 240. In various embodiments, the integrity manifest may include one or more integrity check values and/or relocation fix-up locations, covering the stored content 244, e.g., code store and/or static and/or configuration settings/data. The IMM 256 may access the integrity manifest from the active content 248 and verify that it corresponds, in total or in part, to an integrity manifest controlled by the IMM 256. A comparison may be done of the images through, e.g., a byte-by-byte analysis or through analysis of cryptographic hashes.

In various embodiments, the IMM 256 may search for the active content 248 directly in the memory 224, e.g., through a direct memory access (DMA). In various embodiments, the linear address of the component 240 may be provided to the IMM 256, e.g., through the ISM 252, and the IMM 256 may perform a virtual-to-physical mapping to identify the locations of the active content 248. In an embodiment, the VMM 204 may provide special interfaces to IMM 256 to provide access to active content 248.

In various embodiments, integrity measurement of the active content 248 may be conducted upon initial registration (304), periodically, and/or in some other event-driven manner while the component 240 is executing. Integrity measurement upon initial registration request may help to determine that the initial state of the active content 248 and/or stored content 244 is as expected based on the state of the content at the time it was manufactured, or loaded last. The periodic or event-driven integrity measurements may help to detect attacks that change the protected attributes of the active content 248 and/or stored content 244.

The ISM 252 may receive a response from IMM 256 reflecting verification of integrity of the active content 248 (312). If the verification fails, the ISM 252 may trigger an alert (316). If the verification passes, the ISM 252 may cooperate with a memory manager 264 to partition portions of the component 240 (320).

While FIG. 2 illustrates execution environments being virtual partitions, other embodiments may provide different execution environments through other mechanisms, e.g., using a service processor, and/or an embedded microcontroller. In various embodiments, an auxiliary environment may be partitioned from a host environment via a variety of different types of partitions, including a virtualized partition (e.g., a virtual machine in a Virtualization Technology (VT) scheme), as shown above, and/or an entirely separate hardware partition (e.g., utilizing Active Management Technologies (AMT), "Manageability Engine" (ME), Platform Resource Layer (PRL) using sequestered platform resources, System Management Mode (SMM), and/or other comparable or similar technologies). In various embodiments, a VT platform may also be used to implement AMT, ME, and PRL technologies.

Figure 4:
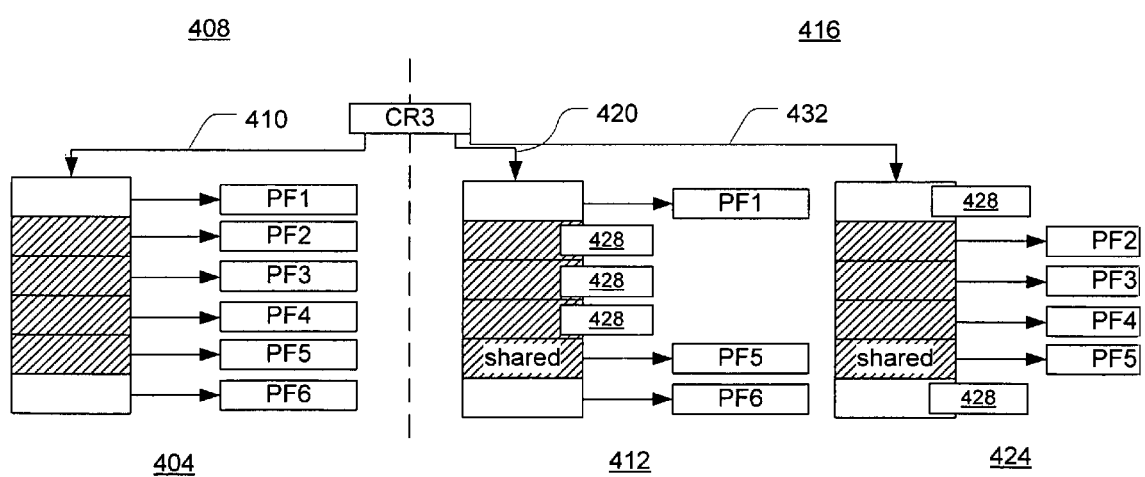
FIG. 4 illustrates partitioning of portions of a component in accordance with an embodiment of the present invention.

FIG. 4 illustrates partitioning of portions of the component 240 in accordance with an embodiment of this invention. In this embodiment, the OS 236 may create a guest page table (GPT) 404 in an OS domain 408 mapping linear addresses of components executing in the VM 228 to physical addresses, or page frames. Component 240 may be set to occupy the $2^{nd}$ through $5^{th}$ page table entries (PTEs), which refer to page frames having active content 248, e.g., PF2-PF5. As is the case in VT platforms, the VMM 204 may monitor and trap page table pointer (e.g., CR3) changes. When OS 236 creates GPT 404 and provides a CR3 value 410 pointing to the GPT 404, the VMM 204 may trap on the CR3 change, create an active page table (APT) 412 (which may be a duplicate copy of the GPT 404) in the VMM domain 416, and change the CR3 value 410 to value 420 pointing to the APT 412. In this way, the VMM 204 can coordinate accesses to the memory 224 from a number of VMs, e.g., VM 228 and VM 232.

In this embodiment, the VMM 204 may also create a protected page table (PPT) 424. The VMM 204 may copy the page frames having the active content 248, e.g., PF2-PF5, into the PPT 424 and assign the page table entries (PTEs) that do not refer to those page frames, e.g., $1^{st}$ PTE and $6^{th}$ PTE, with access characteristics 428 to cause a page fault upon execution. In various embodiments, the access characteristics 428 may be 'not present,' 'execute disabled,' and/or read-only. In an embodiment, the access characteristics 428 may be 'not present' or a combination of 'execute disable' and read-only to prevent unauthorized modifications to the active content 248 from the VM 228. In various embodiments, the setting of the access characteristics 428 may be done by the VMM 204, the component 240, and/or the OS 236.

The VMM 204 may assign the PTEs of the APT 412 that refer to page frames having partitioned portions of the component 240, e.g., $2^{nd}$ PTE-$4^{th}$ PTE, with access characteristics 428. It may be noted that some page frames, e.g., PF5, may be shared between the partitioned and non-partitioned elements. Therefore, in an embodiment the $5^{th}$ PTE may not have access characteristics 428 set in either APT 412 or PPT 424.

In this embodiment, execution flow between the APT 412 and PPT 424 may be managed as follows. Initially, CR3 may have value 420 pointing to APT 412. An execution instruction pointer (EIP) may start with the $1^{st}$ PTE of the APT 412 and, upon an attempted access of the $2^{nd}$ PTE, may cause a page fault due to the access characteristics 428. The VMM 204 may take control, and change CR3 from value 420 to value 432, pointing to the PPT 424. The EIP may resume operation at the $2^{nd}$ PTE of the PPT 424, which may be a partitioned element. The EIP may execute through the $3^{rd}$ PTE, the $4^{th}$ PTE and the $5^{th}$ PTE. When the EIP attempts to access the $6^{th}$ PTE, the access characteristics 428 may cause another page fault and the VMM 204 may switch the CR3 back to value 420, for access to the $6^{th}$ PTE from the APT 412.

In some embodiments, the VMM 204 may monitor the execution flow between the APT 412 and PPT 424 to verify that the points the EIP enters and/or exits the PPT 424 are as expected. Verification that the EIP jumps into the PPT 424 at valid entry points and/or jumps out of the PPT 424 at valid exit points could facilitate a determination that the component 240 and/or other components in the VM 228 are operating correctly. If the entry/exit point is not as expected, the VMM 204 may determine that the access attempt to the partitioned component 240 is unauthorized and may raise an exception, which in various embodiments could include rejecting the attempted access, reporting the rejected access attempt to the OS 236 (for example, by injecting an invalid instruction exception) and/or causing a halt of the OS 236 as controlled by the VMM).

In one embodiment, a page table pointer target list may be used to allow transitions between APT 412 and PPT 424 to occur without invoking VMM 204. A shared page, such as PF5, may be used to store code for a transition point. The code may include a reference to a valid entry point in PPT 424, with a corresponding instruction to change the page table pointer to value 432 to point to PPT 424. The code may also include a reference to a valid exit point in PPT 424, with a corresponding instruction to change the page table pointer to value 420 to point to APT 412. The page table pointer values 420 and 424 may be stored in the target list so that the execution of the transition point instructions does not cause a VM exit. The creation, use, and maintenance of the target list according to an embodiment of the present invention are further described below, in connection with the description of FIG. 5.

Figure 5:
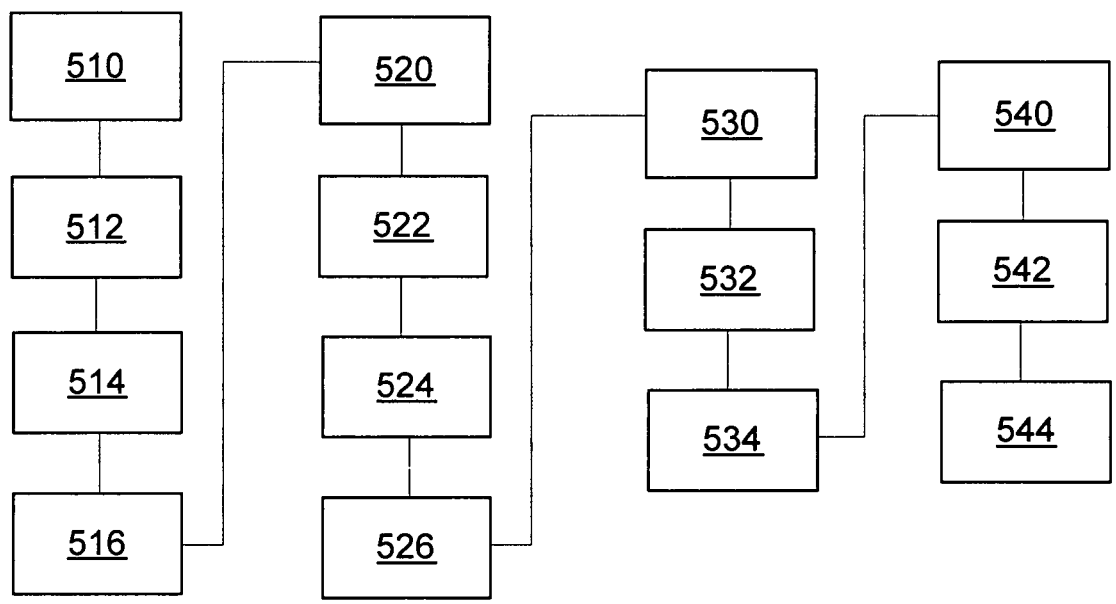
FIG. 5 illustrates transitioning between partitions using a page table pointer target list in accordance with a method embodiment of the present invention.

FIG. 5 illustrates transitioning between partitions using a page table pointer target list in accordance with a method embodiment of the present invention. Operational phases shown in FIG. 5 may be referenced by numerals within parentheses, and relate to and/or take place in connection with operational phases shown in FIG. 3 that may be omitted from FIG. 5.

During registration (510) of component 240 with VMM 204, component 240 provides the address of a shared data structure, which component 240 intends to refer to, to find the values of the pointers to APT 412 and PPT 424. In response, VMM 204 stores the address of the shared data structure in its local memory (512), and stores the values of the pointers to APT 412 and PPT 424 in the shared data structure (514) and in the target list (516). During execution (520) of OS 236, OS 236 may modify the value of its pointer to GPT 404, causing a VM exit. In response, VMM 204 modifies the value of the pointers to APT 412 and PPT 424 (522), and updates the shared data structure (524) and the target list (526).

During execution (530) of component 240 from within an unprotected partition (i.e., from a page mapped into APT 412 but not PPT 424), a transition to a protected partition may be initiated by a reference (e.g., a jump or a call) to a transition point on a shared page (i.e., from a page mapped into both APT 412 and PPT 424). Code from the shared page, accessed through the pointer to APT 412, stores the value of the pointer to PPT 424, from the shared data structure, into the page table pointer storage location (532), without causing a VM exit because the value is stored in the target list. Then (534), code from the shared page (now accessed through the pointer to PPT 424) makes a reference (e.g., a jump or a call) to a page within the protected partition (i.e., a page mapped into PPT 424 but not APT 412), completing the transition from the unprotected partition to the protected partition.

After executing or otherwise accessing the desired portion from the protected partition, a transition back to the unprotected partition may be initiated (540) by a reference (e.g., a jump or a call) to another transition point on a shared page. Code from the shared page, accessed through the pointer to PPT 424, stores the value of the pointer to APT 412, from the shared data structure, into the page table pointer storage location (542), without causing a VM exit because the value is stored in the target list. Then (544), code from the shared page, now accessed through the pointer to APT 412, makes a reference (e.g., a jump or a call) to a page within the unprotected partition, completing the transition from the protected partition to the unprotected partition.

In some cases it may not be desirable or possible to modify the code of a component in order to add the transition code as described above. For example, embodiments of the present invention may be desired to be used to partition components and/or portions of components for which the source code is not available. Therefore, embodiments of the present invention may include the use of a wrapper component to protect a component by transforming transition points out of and into the component.

Figure 6:
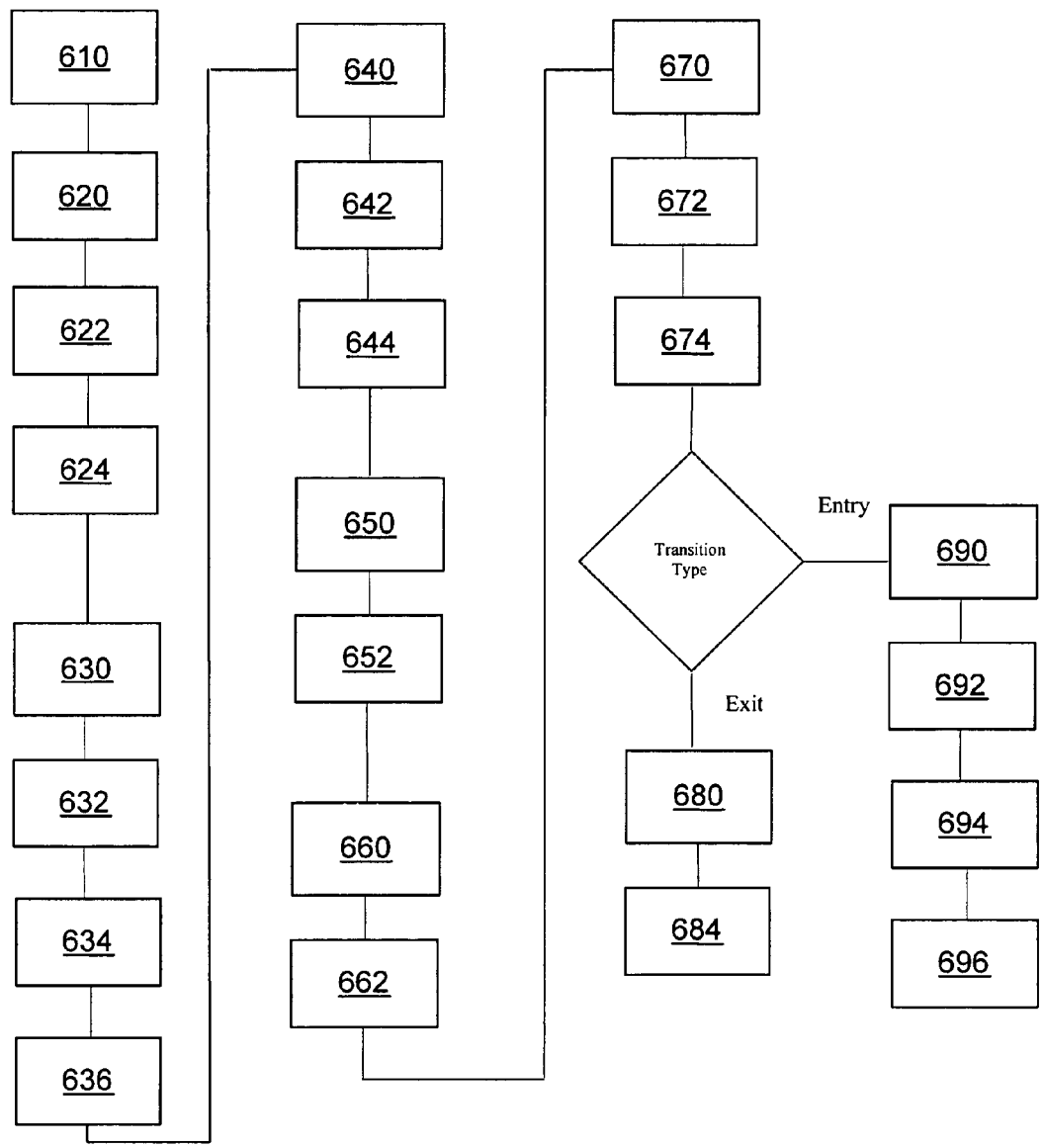
FIG. 6 illustrates transforming the transition points of a first component using a wrapper component in accordance with a method embodiment of the present invention.

FIG. 6 illustrates transforming the transition points of a first component using a wrapper component in accordance with a method embodiment of the present invention. Operational phases shown in FIG. 6 may be referenced by numerals within parentheses, and relate to and/or take place in connection with operational phases shown in FIG. 3 and/or FIG. 5 that may be omitted from FIG. 6.

According to the method embodiment of FIG. 6, wrapper component 280 registers (610) a callback function with OS 236 or a kernel component of OS 236, to be invoked whenever another component is loaded by OS 236. During loading (620) of first component 240, the callback function is invoked (622), and wrapper component 280 verifies (624) that first component 240 is a component to be protected by wrapper component 280 according to an embodiment of the present invention. In an embodiment in a Microsoft Windows environment, wrapper component 280 uses PsSetLoadlmageNotifyRoutine to register the LoadlmageNotifyRoutine callback function, which is invoked when the kernel uses CreateService to load a component.

Upon verification, wrapper component 280 uses the relative virtual address (RVA) of first component 240, passed by the callback function, to begin parsing (630) the binary executable code of first component 240 to find the code section that identifies the transition points. For example, portable executable files contain an import address table (IAT) that lists references to other components. Wrapper component 280 locates (632) the data directory of the portable executable file to find the RVA of the IAT. In the IAT, the wrapper component parses (634) the IMAGE_IMPORT_DESCRIPTOR to find the name of the referenced component. For the given import descriptor, wrapper component 280 finds (636) the IMAGE_IMPORT_BY_NAME structures. From each IMAGE_IMPORT_BY_NAME structure, the RVA of the referenced component is found (640) and stored (642) in a globally accessible cache or other memory structure, and each RVA is replaced (644) with a pointer to wrapper component 280. Therefore, all calls from first component 240 to OS 236 will instead go to wrapper component 280.

For each referenced kernel component, wrapper component 280 searches (650) the kernel header files to get the parameters for each call, so that all calls in first component 240 may be reconstructed (652) in wrapper component 280. Therefore, each of these calls may be performed by wrapper component 280.

Furthermore, wrapper component 280 stores (660) each callback address provided by first component 240, and changes (662) each into an address that points to wrapper component 280. Therefore, all calls back to first component 240 will instead go to wrapper component 280.

During execution (670) of first component 240, each transition to or from another component goes through wrapper component 280. For each transition point, the transition code in wrapper component 280 is invoked (672). Wrapper component 280 determines (674) the processor on which the transition was invoked.

For a transition that is an exit from first component 240, wrapper component 240 loads (680) the processor's CR3 with a pointer to the APT to transition from the protected partition to the other partition, and performs (682) the exit into the other component using the stored call address.

For a transition that is an entry into first component 240, wrapper component 280 determines (690) whether the target list for that processor includes a pointer to the PPT. If so, then wrapper component 280 loads (692) the processor's CR3 with the PPT pointer to transition from the other partition to the protected partition, and performs (694) the entry into first component 240 using the return address from the stack or the stored callback address. If not, a VM exit is performed (696) to transfer control to VMM 204 to request the addition of the desired pointer to the target list.

For a transition that is a dynamic entry into first component 240, additional code within wrapper component 280 may be used to protect the dynamic entry point. For example, first component 240 may call a timer function in OS 236, and pass the address of a function in first component 240 to be called upon expiration of the timer. Therefore, the function is a dynamic entry point which may not be locatable by the static analysis described above. To protect this transition, wrapper component 280 may locate the call to the timer function and direct it to a call within wrapper component 280, as described above. The wrapper component 280, when called by first component 240, may create a new context in which to store the calling context and to then call the timer function, so that the callback will be to wrapper component 280 instead of to the dynamic, un-locatable entry point in first component 240. The new context created by wrapper component 280 is protected to prevent modification of the callback function pointer. After the callback to wrapper component 280, wrapper component 280 may transition to the protected context of first component 240.

Embodiments of the present invention that include transitioning between partitions using a page table pointer target list may provide improved performance over embodiments that do not, because the latter may require more time-consuming VM exits or exceptions requiring handling by an OS or management module. Security may be maintained by marking shared transition pages as read-only, so that they cannot be changed and abused by malicious code.

It may be noted that the page tables shown and described in embodiments of this invention may be simplified for clarity of discussion. In various embodiments of this invention page tables may include multiple levels of indirection and thousands or even millions of entries. Furthermore, in various embodiments, entries at different levels may be identified differently than as identified in discussions herein. For example, on an IA-32 platform, the top level may be referred to as a page directory entry (PDE), while the bottom entry may be referred to as a page table entry (PTE). The partitioning discussed herein may be applied to any of these variations/extensions in accordance with embodiments of this invention.

Embodiments of the present invention shown and described above may facilitate partitioning-off of a component from other components within an execution environment, and transitioning between partitions using a page table pointer target list. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:
1. A method comprising:
controlling, by an operating system, operation of a first component;
parsing, by a wrapper component, binary executable code of the first component to find a transition point;
transforming, by the wrapper component, the transition point between the operating system and the first compo- nent to go through the wrapper component during execution in a virtual machine without causing a virtual machine exit; and partitioning off the first component to control access by the operating system to the first component, including creating, by the wrapper component, a new context in which to store a calling context before calling an operating system function so that a callback is to the wrapper component instead of a dynamic entry point in the first component.

2. The method of claim 1, wherein said partitioning off the first component comprises copying the content from an operating system accessible location in a memory to an operating system restricted location in the memory to control access by the operating system to the first component.

3. The method of claim 2, wherein said partitioning off the first component comprises:
creating a protected page table; and
operating the first component from the protected page table to control access by the operating system to the portion of the first component.

4. The method of claim 3, further comprising:
operating a portion of the operating system from another page table; and
managing, by the wrapper component, execution flow between the another page table and the protected page table to control access by the operating system to the first component.

5. The method of claim 4, further comprising locating, by the wrapper component, the transition point in the first component.

6. The method of claim 5, further comprising changing a transition point address from an address referring to the first component to an address referring to the wrapper component.

7. The method of claim 6, further comprising mapping a page including the transition point into both the another page table and the protected page table.

8. The method of claim 7, further comprising storing a pointer to the protected page table in a list of pointers that are storable into a page table pointer storage location without causing a virtual machine exit, the page table pointer storage location to point to page tables to be used to translate an address within the address space of the first component to a physical address.

9. A non-transitory machine accessible medium having associated instructions, which, when accessed, results in a machine:
parsing, by a wrapper component, binary executable code of a first component to find a transition point between an operating system and the first component;
transforming the transition point to go through the wrapper component during execution in a virtual machine without causing a virtual machine exit; and
managing execution flow between a protected page table and an unprotected page table to control access by the operating system to the first component, including creating, by the wrapper component, a new context in which to store a calling context before calling an operating system function so that a callback is to the wrapper component instead of a dynamic entry point in the first component.

10. The machine accessible medium of claim 9, wherein the associated instructions, which, when accessed, further results in the machine changing a transition point address from an address referring to the first component to an address referring to the wrapper component.

* * * * *